Inventor

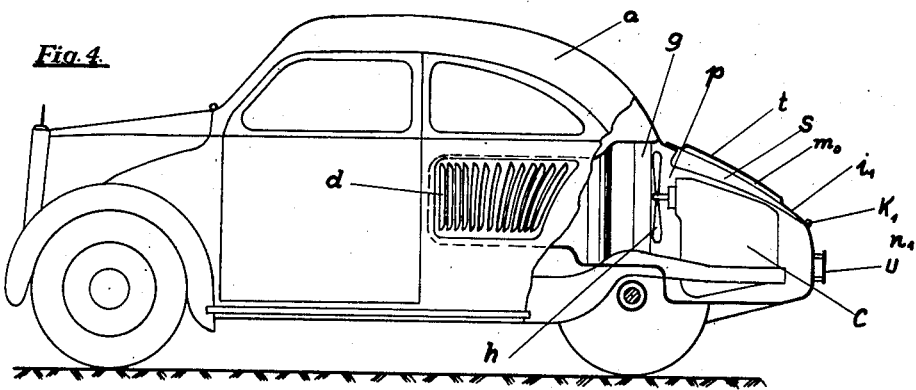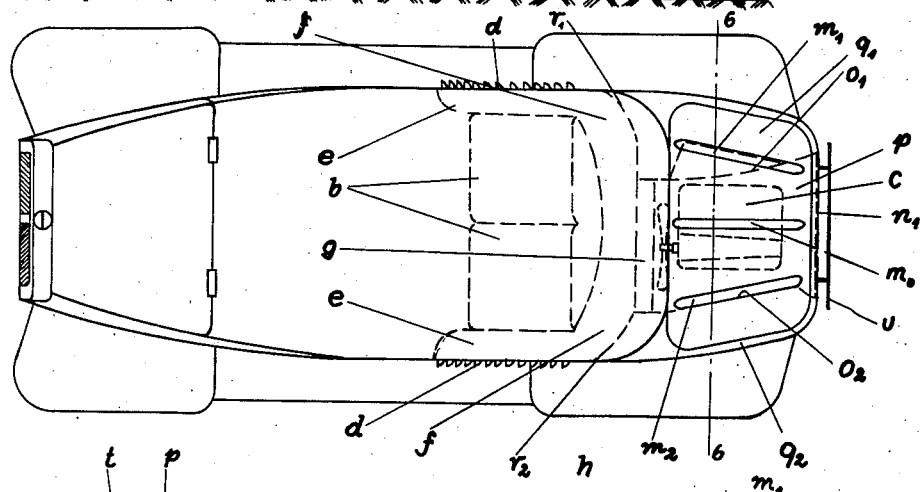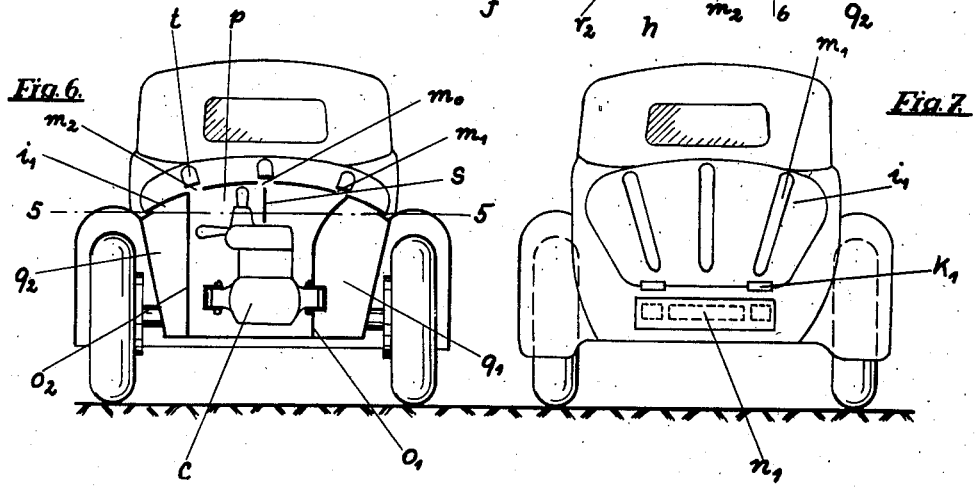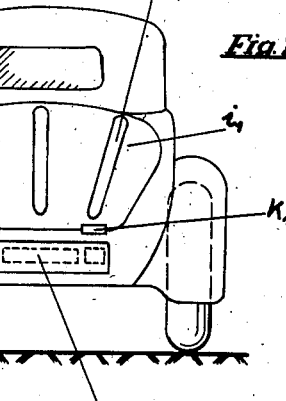

Patented Aug. 11, 1936

2,050,451

UNITED STATES PATENT OFFICE 2,050,451

COOLING OF MOTOR CAR ENGINES

Fritz Nallinger, Stuttgart, Germany, assignor to Daimler-Benz Aktiengesellschaft, Stuttgart-Unterturkheim, Germany, a company of Germany Application March 17, 1934, Serial No. 716,170
In Germany March 22, 1933

14 Claims. (Cl. 180—54)

This invention relates to an arrangement for cooling the engines of motor vehicles in which more particularly the engine or cooler is disposed in the rear part of the vehicle and has for one of its objects to provide means for guiding the cooling air in a specially advantageous manner.

A particular advantage is obtained according to the invention by the inlet openings for the cooling air being disposed laterally of the interior of the vehicle body. This results in an advantageous utilization of the side walls, more particularly of the arm supports for the back seats, the possibility of obtaining a sufficiently great cross-sectional area for the inlet slits situated between the window, door and rear mudguard and a suitable guiding of the air to the engine or cooler lying further back. The engine or cooler is also more readily accessible than in an arrangement where the cooling air inlet is provided laterally next to the engine, as with the latter arrangement it would only be possible to obtain a more or less sufficient cooling effect by a roundabout course for the air.

The invention also provides for a more effective cooling by a suitable arrangement of the outlet slits. This arrangement consists substantially in this that the slits extend not in the transverse direction, but in the longitudinal direction. By this means a more steady constant exit of the cooling air is effected, more particularly when the air is driven by a fan through the engine space or the air duct, as, owing to the motion imparted to the air by the fan, the air emerging from the slit on one side, when transverse slits are provided, is drawn in again by suction on the other side and an effective flow of cooling air is thus hindered.

The invention furthermore relates among others to particularly suitable arrangements of these longitudinal slits.

The invention is applicable both to air cooling and water cooling and is specially suitable for stream line bodies.

Figure 1:
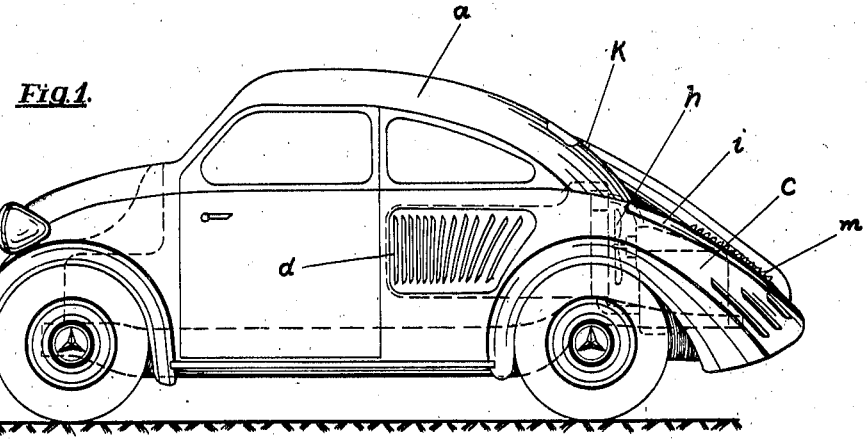

In the accompanying drawings two constructional examples are illustrated,

Fig. 1 being a side elevation and

Figure 2:
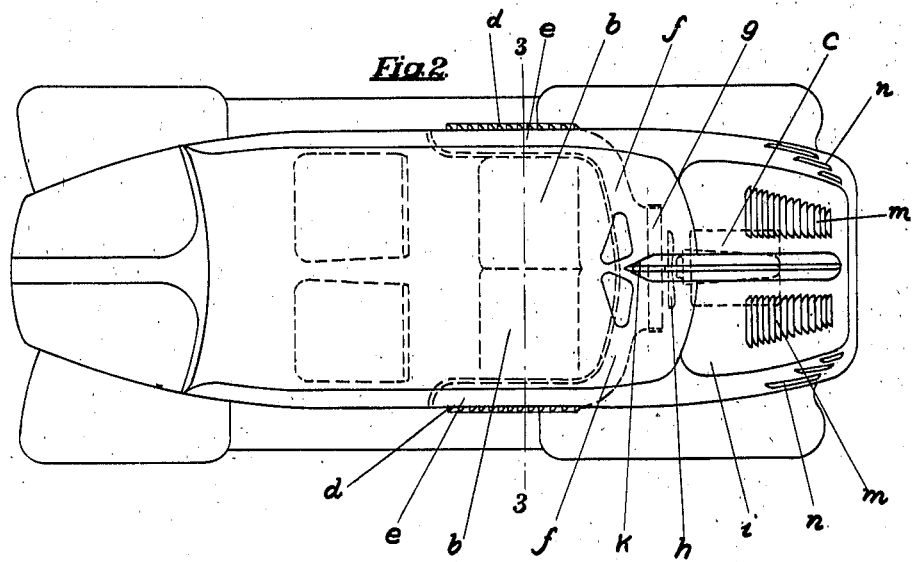

Fig. 2 the plan view of one constructional example and

Figure 3:
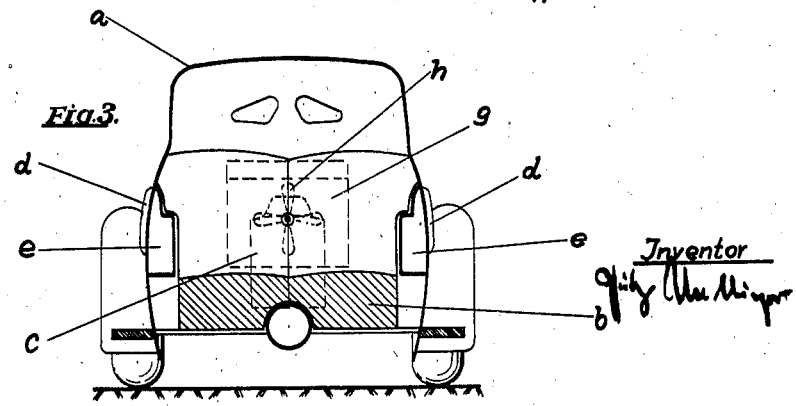

Fig. 3 a section through the vehicle on line 3—3 of Fig. 2,

Fig. 4 a side elevation, partly in section, of the other constructional example, Fig. 5 the plan view of the vehicle, also partly in section on line 5—5 of Fig. 6, Fig. 6 a section on line 6—6 of Fig. 5 and Fig. 7 a rear elevation of this vehicle.

In Figs. 1 to 3 of the drawings $a$ is a closed stream line body, in the rear part of which behind the seats $b$ an engine $c$ is mounted, which drives for instance the rear wheels. The air, the main object of which is for cooling, enters at the side walls of the body next to the seats $b$ through the gill-like cooling slits $d$ which are disposed below the rear side windows and lead into the hollow side walls acting as arm rests $e$ for the passengers. From there the air is conducted around the seats through ducts $f$ rearwardly, where it flows through the radiator $g$ disposed in front of the engine and then enters the engine space. A fan $h$ or other blower is provided for conveying the cooling air. The engine may be surrounded, more particularly in the case of air cooling, by a separate jacket, through which the cooling air may be conveyed for the more intensive and direct cooling of the engine cylinders.

The engine space is closed at the top by a cover $i$ having a strong rib, which is hinged at the upper end of the rib at $k$ to the body and is provided in its lower or rear part with slits $m$ for the escape of the cooling air. Further outlet slits $n$ are also provided in the wall of the body at the rear end.

In order to protect the interior of the body against the cold cooling air sweeping through, more particularly in the winter, the walls between the cooling ducts $e$, $f$ and the interior of the vehicle may be made heat-insulating in any suitable way, being for instance made with double walls and, if necessary, heated.

The air conveying ducts may furthermore be so arranged as to have no sudden bends, so that the stream of air will be offered as little resistance as possible.

In the constructional form shown in Figs. 4 to 7 the same reference letters are used for the parts corresponding to those of Figs. 1 to 3. This constructional form differs from that already described substantially in this, that the rear space in the vehicle is divided by two longitudinal walls $o_1$ and $o_2$ into a central duct $p$ containing the radiator and the engine and into the two lateral spaces $q_1$ and $q_2$. The latter are shut off from the ducts $f$ by walls $r_1$, $r_2$.

According to the invention there are further provided for the egress of the cooling air the longitudinal slits $m_1$, $m_0$ and $m_2$, which are located in the cover $i_1$ which is hinged at $k_1$ and slopes down backwards. Suitably the longitudinal slits $m_1$ and $m_2$ are disposed at the upper edges of the longitudinal walls $o_1$ and $o_2$ and the middle longitudinal slit $m_0$ at a central longitudinal rib or partition s. This arrangement has the advantage that the walls $o_1$, $o_2$ and s act as guiding walls for the air put in rotary motion by the fan and force the air out of the slits. Furthermore, through the provision of longitudinal slits the disadvantage is avoided that the rotary motion of the air about the longitudinal axis of the space in the duct or about the axis of the fan is not continued to the outside, as is the case with transverse slits, where the greater part of the air entering at one side of the transverse slit is drawn in again by suction at the other side of the slit and thereby results in a heaping of the air and a diminished cooling effect.

Each of the slits $m_1$, $m_0$, and $m_2$ is screened on the outside by a sheet metal strip t which is connected to the engine hood for instance only at the ends or at intermediate points, so that the air emerging from the slit is led away to both sides under the sheet metal strip.

Furthermore the substantially transversely arranged openings $n_1$ are provided at the rear end of the engine space as an additional air outlet, so that no air pocket will be formed in the rear part of the space. This opening or these openings are screened by a shield u, for instance the number plate of the vehicle, for preventing the air escaping directly rearwards.

The longitudinal slits might be arranged instead of in the engine hood or in addition thereto in the bottom or in the side walls of the body. Furthermore it is not absolutely necessary for the slits to be directly at the edges where the longitudinal walls meet, as even with another arrangement of the longitudinal slits a considerably better effect is obtained than with transverse slits. The engine hood $h$ may cover all three spaces $p$, $q_1$, $q_2$ or only the space $p$. Between the walls $o_1$, $o_2$ or the outer walls and the cover special packing may be provided so as to prevent the air escaping laterally outside the engine space or circumventing the radiator.

The arrangement of the outlet slits can also be employed with vehicles in which the air is supplied in any way; for instance instead of from the side also from above, from below, through a tube from the front or the like.

What I claim is:

1. In a motor vehicle with a space inside the body, seats in the said inner space, lateral arm rests for the said seats and an engine or radiator disposed in the rear part of the vehicle, a cooling arrangement comprising a conveying space for the cooling air, formed by the hollow space in an arm rest, inlet openings through which the cooling air can enter from the outside into the hollow space in the arm rest and means for conducting the cooling air from there to the engine or radiator.

2. In a motor vehicle with a space inside the body, seats in the said inner space, lateral arm rests for the said seats and an engine or radiator disposed in the rear part of the vehicle, a cooling arrangement comprising an inlet space for the cooling air formed by the hollow space in an arm rest, substantially vertically disposed gill-like inlet slits in the outer wall of the said inlet space through which the cooling air can enter from the outside into the hollow space in the arm rest and means for conducting the cooling air from there to the engine or radiator.

3. In a motor vehicle as claimed in claim 1 the combination with a double wall by which the arm rest is bounded with respect to the inner space.

4. In a motor vehicle an engine or radiator disposed in the rear part of the vehicle, a duct-like space which surrounds the engine or radiator and becomes lower towards the back and which is swept through by the cooling air for the engine from the front to the back, and outlet slits in the rearwardly descending wall of the cover of the said duct-like space, which slits extend in the longitudinal direction of the same and out of which the cooling air can escape to the outside.

5. In a motor vehicle with a space inside the body, rear seats in the said space, arm rests disposed laterally of the said seats and an engine or radiator disposed behind the said inner space, a cooling arrangement comprising inlet openings for the cooling air disposed laterally of the space inside the body within the arm rests, ducts passing around the space inside the body from the inlet openings towards the rear, a duct-like space containing the engine or radiator, which forms a continuation of the said ducts, and outlet openings for the egress of the air out of the duct-like space.

6. In a motor vehicle an engine disposed in the rear part of the vehicle, inlet openings for the cooling air on both side walls of the body in front of the engine, conducting ducts for the cooling air on both walls extending from said inlet openings to the engine, said ducts being united in front of the engine, longitudinal walls disposed on either side of the engine and extending in the direction of travel, by which a channel-like engine space of less width than that of the vehicle body is formed, through which the cooling air flows substantially from front to back.

7. In a motor vehicle, a body, two vertical longitudinal walls in the rear part of the body spaced apart from one another a less distance than the width of the body and dividing off from the rear part of the body interior a channel-like space of less width than that of the body and extending substantially in the longitudinal direction of the vehicle, an engine disposed in said channel-like space, an air inlet conduit for said channel-like space and a cover for covering the rear part of the body and said channel-like space, said cover having longitudinal slits therein for establishing communication between the said space and the outside so that the cooling air for the engine flows through the space substantially from front to rear.

8. In a motor vehicle, the combination as set forth in claim 7, in which the channel-like space with the cover form a structure having an angular cross-section and the longitudinal slits are disposed at the edges where the cover and the vertical longitudinal walls meet.

9. In a motor vehicle, the combination as set forth in claim 7 with a fan in the channel-like space arranged therein with its axis of rotation extending substantially in the longitudinal direction of the space, so that the cooling air flowing through the said space has a rotary movement imparted to it around said axis.

10. In a motor vehicle, the combination as set forth in claim 7 in which the channel-like space with the cover form a structure having an angular cross section and the longitudinal slits are disposed at the edges where the cover and the vertical longitudinal walls meet and including a fan in the channel-like space arranged therein with its axis of rotation extending substantially in the longitudinal direction of the space, so that the cooling air flowing through the said space has a rotary movement imparted to it around said axis.

11. In a motor vehicle with a space inside the body, rear seats in said inner space and an engine or radiator disposed behind the inner space in the rear part of the vehicle, an arrangement for supplying cooling air for cooling the engine, comprising inlet openings in the side of the body laterally of the rear seats and forwardly of the backs thereof, a duct leading from said openings and extending along the side of the body rearwardly beside the seats, around the backs of the seats and from there to the engine or radiator for leading the cooling air to the engine or radiator from said inlet openings.

12. In a motor vehicle with a space inside the body, rear seats in said inner space and an engine or radiator disposed behind the inner space in the rear part of the vehicle, an arrangement for supplying cooling air for cooling the engine, comprising inlet openings in the sides of the body on either side of the rear seats and forwardly of the backs thereof, ducts leading from said openings and extending rearwardly along the respective side walls of the body beside the seats, extending around the backs of the seats and being united behind the seats to form a single duct extending to the engine or radiator for leading the cooling air from said inlet openings to the engine or radiator.

13. In a motor vehicle, a body having a rear vertical end wall transverse to the longitudinal axis of the vehicle, an engine disposed in the rear part of the body, said body having a passage space for supplying cooling air to the engine and extending to the said rear end wall of the body, said passage space having an inlet at its forward end and an outlet at its rear end in the said rear transverse end wall of the body, and a rear number plate extending transversely to the longitudinal axis of the vehicle and spaced from the said rear end wall of the body behind the said outlet for screening the outlet from behind.

14. In a motor vehicle, the combination as set forth in claim 13 with an upper cover wall covering the said passage space and having outlet slits therein extending substantially in the longitudinal direction of the vehicle.

FRITZ NALLINGER.